United States Patent [19]

Nicolai

[11] Patent Number: 4,736,710

[45] Date of Patent: Apr. 12, 1988

[54] DEVICE FOR PICKING UP ANIMALS E.G. CHICKENS FROM A GROUND SURFACE

[76] Inventor: Roel Nicolai, 3, Hamsherne, 9289 LD Drogeham, Netherlands

[21] Appl. No.: 671,201

[22] Filed: Nov. 14, 1984

[30] Foreign Application Priority Data

Nov. 14, 1983 [NL] Netherlands .................. 8303892

[51] Int. Cl.⁴ .............................................. A01K 29/00
[52] U.S. Cl. ...................................................... 119/82
[58] Field of Search ......................................... 119/82

[56] References Cited

U.S. PATENT DOCUMENTS 3,568,643  3/1971  Wessinger ........................... 119/82
3,683,862  8/1972  Reynolds ............................. 119/82
4,232,632  11/1980  Kice ..................................... 119/82

Primary Examiner—Hugh R. Chamblee
Attorney, Agent, or Firm—John P. Snyder

[57] ABSTRACT

A device for picking up animals such as chickens from a ground surface and for conducting them away, comprising a frame, a suction conveyor arranged on the frame and provided with suction means and delivery means adjoining said suction conveyor. The suction conveyor comprises a suction surface having suction apertures through which the suction means can suck in air and guiding and driving means for moving animals picked up by the suction surface towards the delivery means.

19 Claims, 5 Drawing Sheets

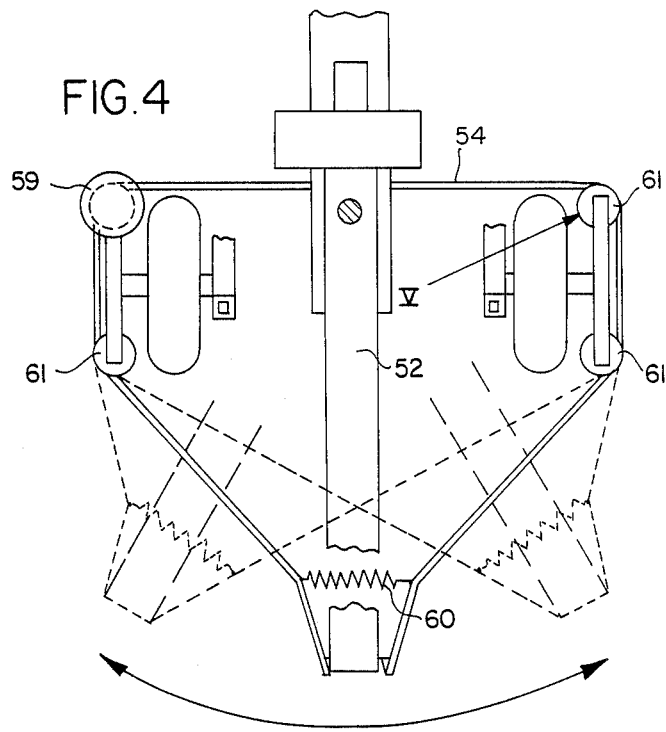
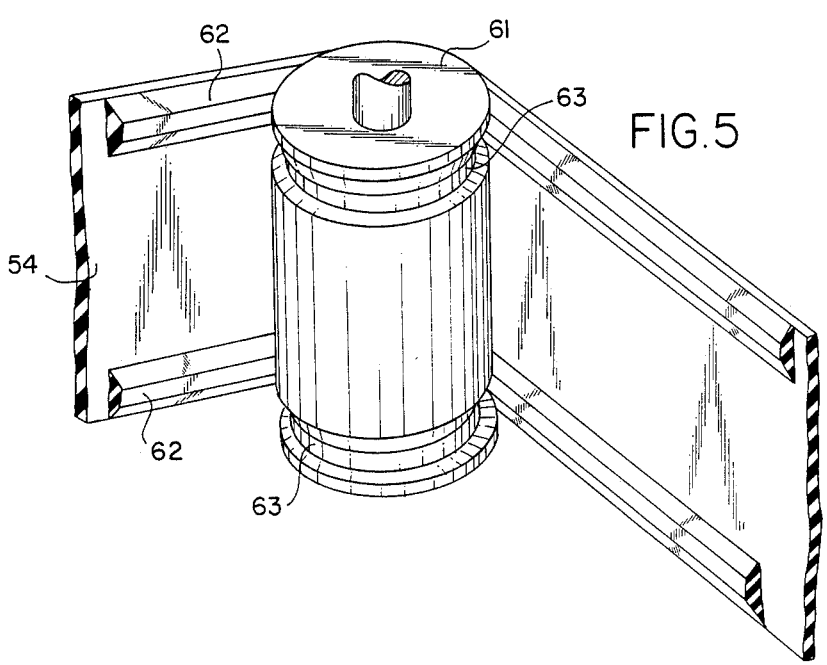

DEVICE FOR PICKING UP ANIMALS E.G. CHICKENS FROM A GROUND SURFACE

The invention relates to a device for picking up animals such as chickens from a ground surface and for conducting them away, comprising a frame, a suction conveyor arranged on the frame and provided with suction means and delivery means adjoining said suction conveyor.

Such a device, in particular intended for picking up chickens, is known from Dutch Patent Application No. 7102653. In this known device the suction conveyor comprises a suction duct ending in a nozzle, through which the chickens are "sucked up". The chickens are conveyed upwards through the suction duct and conducted away through a chute. Although this device, provided it operates well, can convey the chickens without risk of injury, the suction pipe may get clogged. Unclogging the suction pipe is particularly difficult and obviously this is at the least annoying for the chickens present in the suction pipe.

The invention has for its object to provide a device of the kind set forth in the preamble by which animals can be effectively lifted and conveyed away under any condition without risk of injuries.

In a device according to the invention this is achieved in that the suction conveyor comprises a suction surface having suction apertures through which the suction means can suck in air and guiding and driving means for moving animals picked up by the suction surface towards the delivery means. The animals are conducted away at all times without the risk of stagnation so that injury cannot occur. Moreover, interruptions of the work are thus excluded.

In an advantageous embodiment of the device in accordance with the invention the suction surface is formed by the active part of a suction conveyor belt defined by the guiding and driving means, extending above the ground surface and sloping upwards at least partly in the direction of movement. A device embodying the invention suitable for picking up objects other than animals is characterized in that the suction conveyor belt is arranged at the end of an arm being pivotable about a pivotal shaft connected with the frame and being perpendicular to the ground surface. During a uniform propagation of the frame, which may be mobile or be carried by a mobile device, and during the performance of a reciprocatory swinging movement of the pivotable arm a large surface can be covered within a short time.

A preferred embodiment of the invention is achieved in that the frame is provided with wheels bearing on the ground, and in that an oblong belt-like member with its ends is connected to the arm near the ground and in that tension and guiding means are provided guiding the belt-like member between its ends with its plane transverse to the ground and with a longitudinal edge closely near the ground around at least the wheels in the area near the arm. The belt-like member reliably prevents animals from coming under the wheels or getting wedged under the arm.

An especially favourable further development is obtained by reciprocating driving means connected to the frame and engaging the belt-like member for to and fro moving from the arm. In this way the belt besides having a safety function also can provide for the driving function for the swing arm.

The arm is advantageously hollow and constitutes a suction channel for the suction means. Thus the arm has a closed, smooth construction.

In a further development of the invention the suction means are integral with the arm. In this way a rugged construction insensitive to disturbances is obtained.

Further features and advantages of the invention will become apparent from the following description of preferred embodiments thereof with reference to the accompanying drawings.

FIG. 4 is a schematic view from above of a front part of the device of FIG. 3.

FIG. 5 is a detailed view according to V in FIG. 4.

Figure 1:
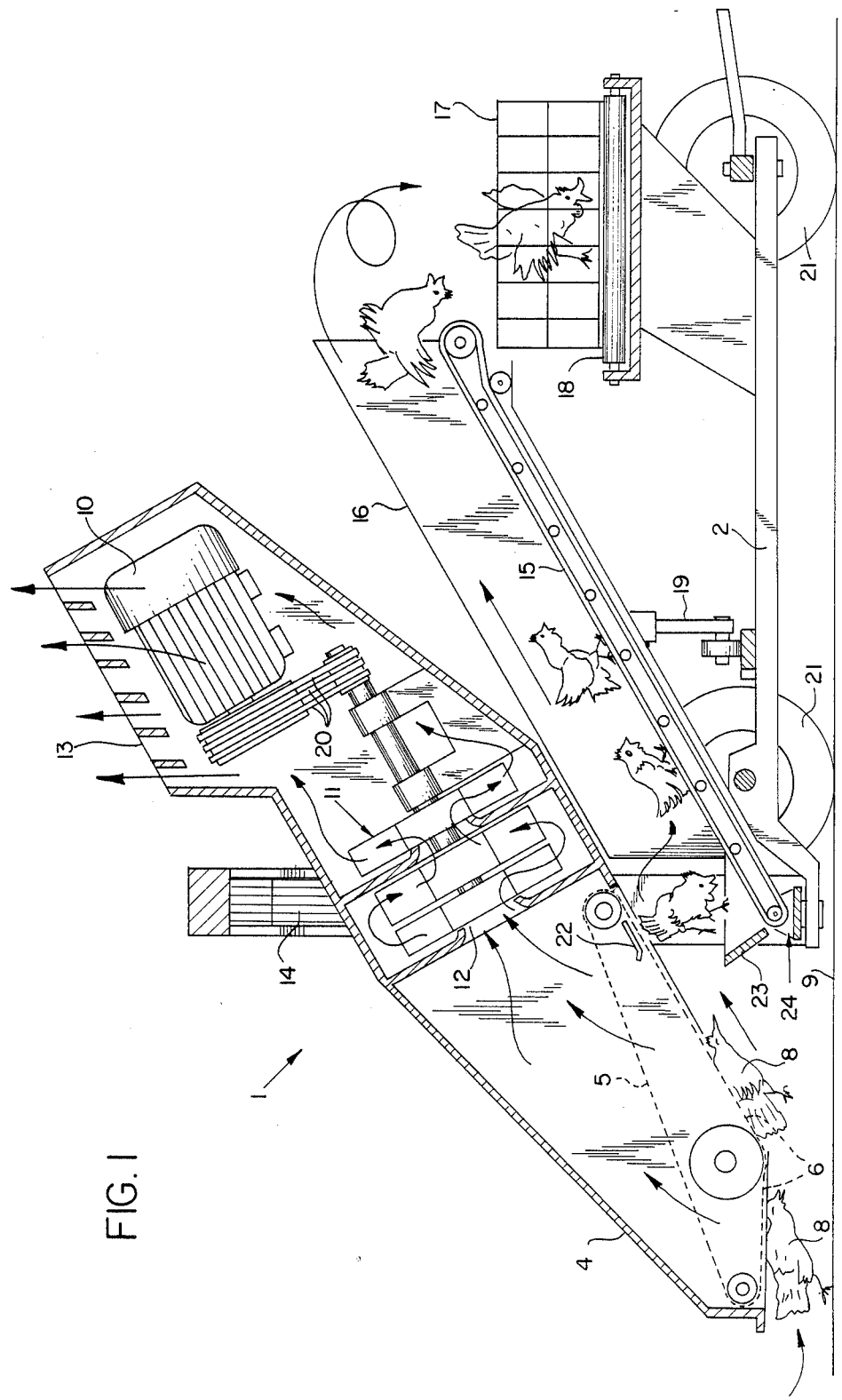
FIG. 1 is a fragmentary side elevation of a device embodying the invention.

The device 1 of FIG. 1 comprises a frame 2 provided with wheels 21 by which it can run on the ground surface 9. The frame 2 is provided with a suction conveyor 3. The suction conveyor 3 is accommodated in an arm 4, which is pivotable about a vertical pivotal shaft 14. At the lower end the arm 4 has a suction conveyor belt 5. This suction conveyor belt 5 is guided by guide rollers 7 rotatably journalled in the arm 4. The guide rollers 7 ensure that the suction conveyor belt 5 forms an active part 6 extending at a distance above the ground surface 9. This active part 6 is shown in FIG. 1 as being driven in a movement to the right. The active part 6 comprises a first horizontal portion and a second portion sloping upwards in the direction of movement.

Through the suction conveyor belt 5 having suction apertures and consisting, for example, of gauze-like material air can be sucked in. This air is sucked in by a two-stage centrifugal compressor 11 driven by a motor 10 through a rope transmission 20. The centrifugal compressor 11 has a suction opening 12 for sucking in the air. The sucked-in air is conducted away on the rear side of the compressor and leaves the arm 4 through a blow-off opening 13.

As is shown the arm 4 is hollow and constitutes a suction channel. The suction means formed by the centrifugal compressor 11, the transmission 20 and the motor 10 are structurally integral with the arm 4.

The air sucked in through the conveyor belt 5 when the suction means are switched on, creates at the area of the active part 6 such a subatmospheric pressure that animals standing on the ground 9, for example, chickens 8 are sucked towards the first horizontal part of the active part 6 of the suction conveyor belt 5. Since the suction conveyor belt 5 is moving, the chickens 8 sucked against it are moved along to the right as viewed in FIG. 1. On the second ascending portion of the active part 6 the picked-up chickens are lifted to a higher level. At the end of the ascending portion of the suction conveyor belt 5 a screening plate 22 is arranged on the rear side thereof so that at the area of this screening plate 22 the suction force of the conveyor belt is strongly reduced. As soon as a chicken 8 has been transported into the region convered by the screening plate 22, it is released by the suction conveyor belt 5.

Below the portion of the active part 6 of the suction conveyor belt 5 defined by the screening plate 22 is arranged a collecting tray 23 comprising the lower end of a conveyor belt 15. Thus the chickens drop over a short distance from the suction conveyor belt 5 onto the conveyor belt 15. The collecting tray 23 prevents the picked-up chickens from dropping off the conveyor belt 15. The conveyor belt 15 is driven so that its upper run moves upwards to the right as viewed in FIG. 1. The chickens 8 moved onto it are conducted away by the conveyor belt 15. The surface of the conveyor belt 15 may be advantageously provided with grip-improving means such as ridges so that the conveyor belt 15 can satisfactorily carry along the chickens. Around the conveyor belt 15 is arranged a tunnel 16, which prevents the chickens 8 from dropping laterally off the conveyor belt.

Below the end of the conveyor belt 15 a roller track 18 is arranged on the frame 2. On this roller track 18 is deposited a transport skeleton case 17 for the chickens 8. At the end of the conveyor belt 15 an operator can take care of the chickens 8 to conveniently enter the case.

With the roller track may be integrated a counting-/weighing device (not shown). This device weighs the case 17 whilst being filled and indicated on a panel the overall weight of the chickens in the case 17. Since the chickens have the same weight within narrow tolerances, the counting/weighing device can be suitably programmed by said weight so that the number of chickens in the case 17 can be displayed on the panel. As soon as the required number of chickens is collected in the crate, it can be closed and conducted away.

The conveyor belt 15 and the surrounding tunnel 16 can turn to a limited extent about the centre line determined by the pivotal shaft 14. The conveyor belt 15 is supported by a bearing 24 near the front end and by a support 19 provided with a guide roller. By turning the conveyor belt 15, its delivery end can be turned above an empty transport crate after a transport crate 17 has been filled. This manipulation is clearly apparent from the device of FIG. 2 having in this respect a similar structure.

Figure 2:
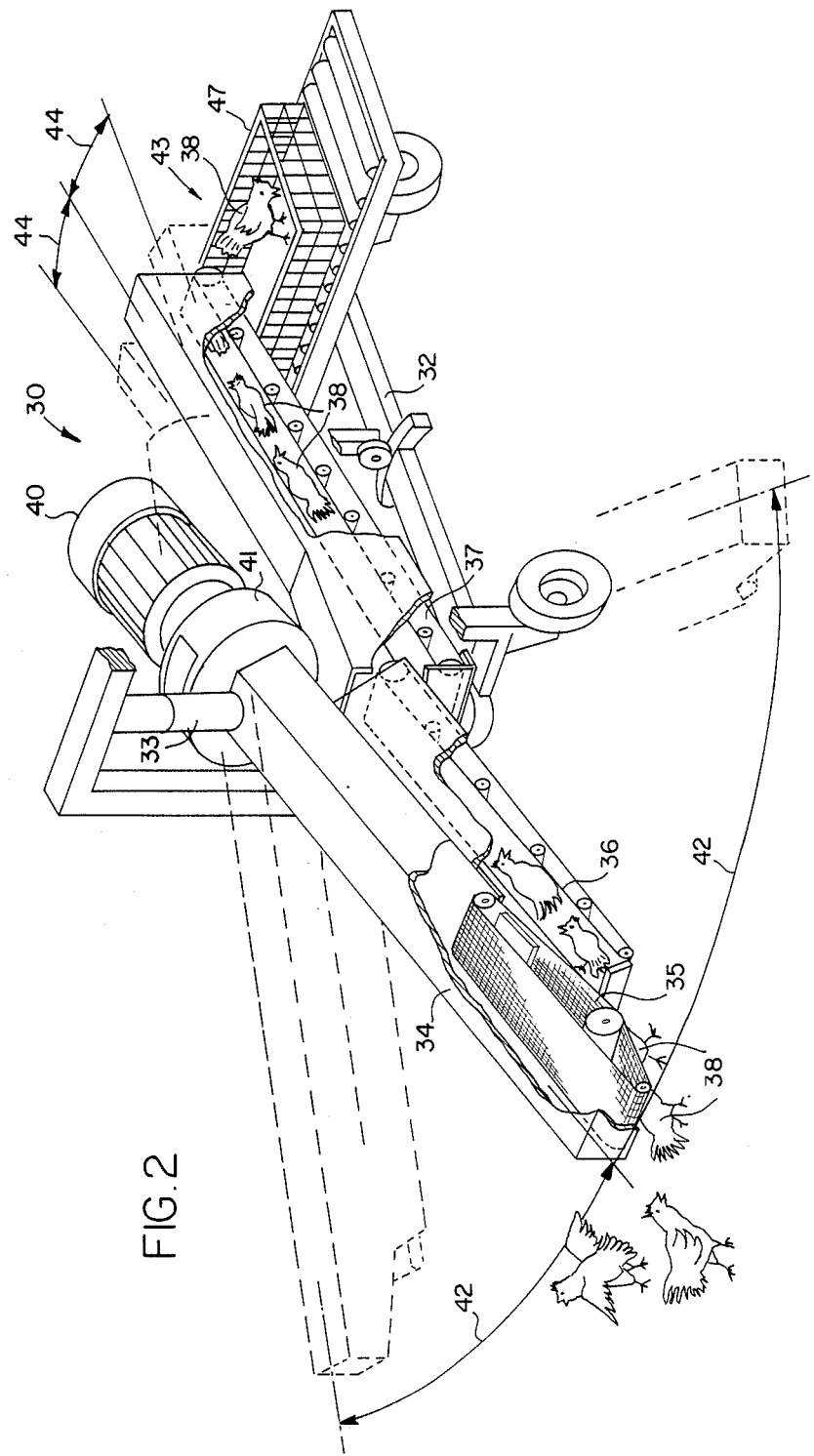
FIG. 2 is a fragmentary, perspective view of a device embodying the invention in another design.

The device 30 of FIG. 2 comprises a frame 32, the front end of which is again provided with an arm 34 adapted to turn about a pivotal shaft 33. At the front end of the arm is arranged a suction conveyor belt 35 and on the rear side are provided suction means formed by a motor 40 and a ventilator or a compressor 41. The suction means again suck in air through the apertured conveyor belt 35, which can thus take up chickens 38 from the ground surface.

Contrary to the device 1, where the active part 6 of the suction conveyor belt 5 extends up to the pivotal shaft 14, the suction conveyor belt 35 of the device 30 of FIG. 2 covers a smaller distance. In this embodiment by the arm 34 an elevator belt 36 adjoins the suction conveyor belt 35 and extends up to the pivotal shaft 33. On the one hand this provides the advantage that the total surface of the active part of the suction conveyor belt 35 may be smaller so that the suction means 40, 41 may have a lower capacity for exerting nevertheless sufficient suction force. With regard thereto the arm 34 may be longer so that the range of turn indicated by the curved arrows 42 of the arm 34 can be enlarged. As shown in FIG. 2, the delivery conveyor belt 37 extends from the pivotal shaft 33 i.e. from the end of the elevator belt 36 up to the delivery station 43. In the delivery station 43 the chickens 38 supplied by the elevator belt 37 are collected in transport crates 47. As is indicated by the arrows 44 and as stated with reference to FIG. 1 for the conveyor belt 15 the delivery conveyor belt 37 is pivotally connected with the frame 32 near the pivotal shaft 33. The conveyor belt 37 can be moved into the positions indicted by broken lines so that it can be simply turned above an empty case when the preceding case has been filled.

Apart from the delivery of the chickens 38 in transport crates 47, delivery may take place via a transport device of known kind adjoining the delivery station 43 for conducting the chickens further away, for example, to a transport wagon.

The propelling means for the device embodying the invention are preferably continuously adjustable so that the rate of operation can be adapted to circumstances. Moreover, the driving means for the suction conveyor belt, the elevator belt and the delivery conveyor belt are preferably continuously controllable so that their operational speed can also match the prevailing conditions.

Figure 3:
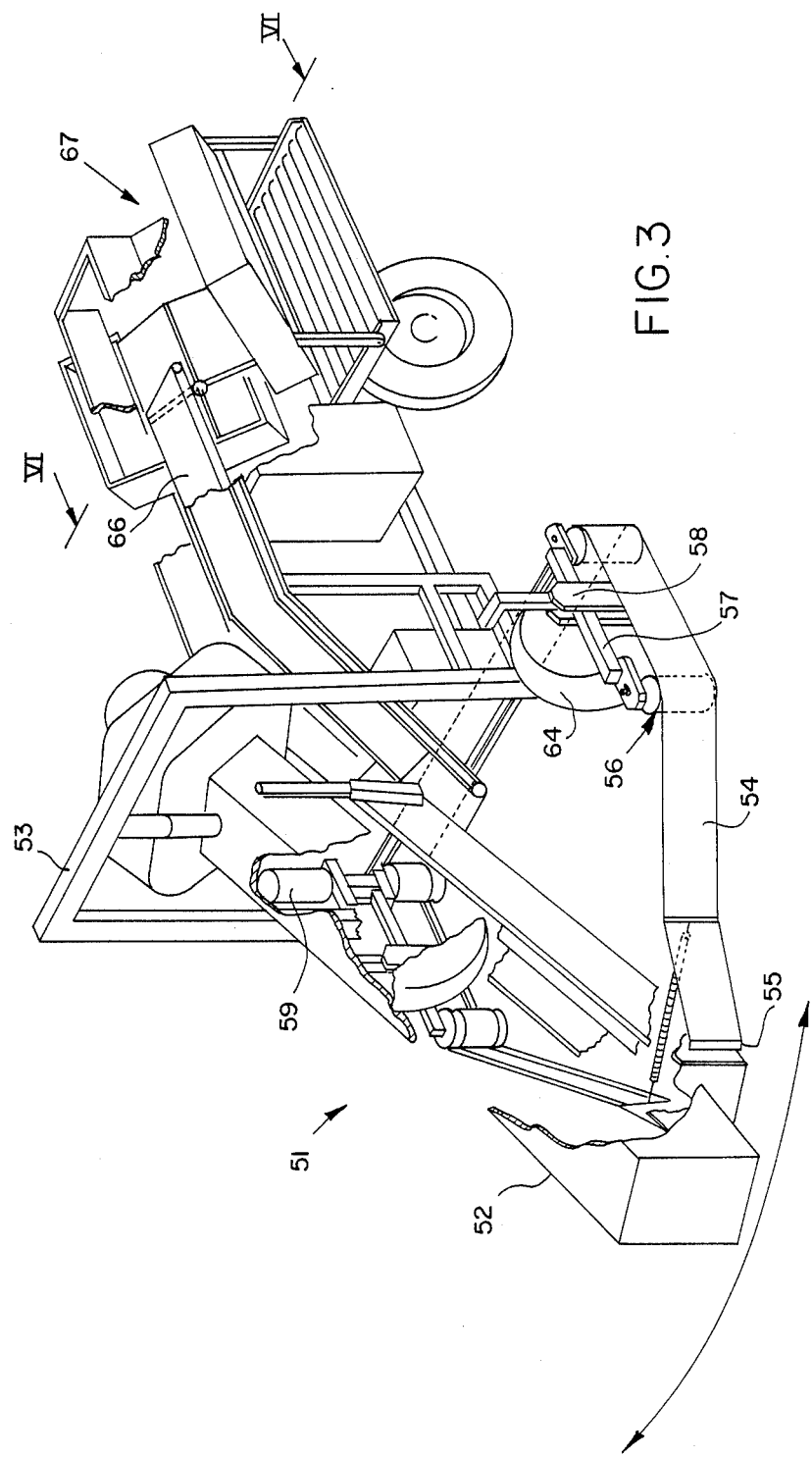
FIG. 3 is a perspective view partly broken away of a third embodiment of the device.

The device 51 of FIG. 3 structurally corresponds substantially with the device 30 of FIG. 2. Therefore, only the details deviating with regard to the device 30 will be discussed.

The device 51 comprises a belt 54 which is connected with its end 55 to the end of the arm 52. Further guiding means 56 are provided, guiding the belt 54 in such a way around the wheels 64 of the frame 53, that the belt extends with its plane transverse to the ground and with a longitudinal edge close near the ground. The belt 54 forms a screen preventing the animals like the chickens from coming under the wheels 64 or from becoming wedged under the arm 52.

In this embodiment the guiding means 56 comprise four rollers 61 being rotatably connected in pairs to a subframe 57 near each wheel 64. The subframes 57 each are swingably journalled in a support 58 in such a way that each subframe 57 can swing around an axis extending parallel to the axis of the wheels 64. In this way the guiding means 56 can follow the movements of the belt 54 when the arm 52 swings somewhat upwards.

As is shown in FIG. 5 to the back side of the belt 54 two V-belts 62 are connected, engaging in V-grooves 63 of the guiding rollers 61.

The arm 52 is swung to and fro by means of the belt 54 which is driven by the motor 59. The motor 59 can be controlled in a known way by end switches which are activated in the respective end positions of the arm 52 and which reverse the rotational direction of the motor 59.

To keep the belt tensioned in all swinging positions of the arm 52, a tension spring 60 is provided between the sections of the belt 54 extending from the end of the arm to the first roller 61.

Figure 6:
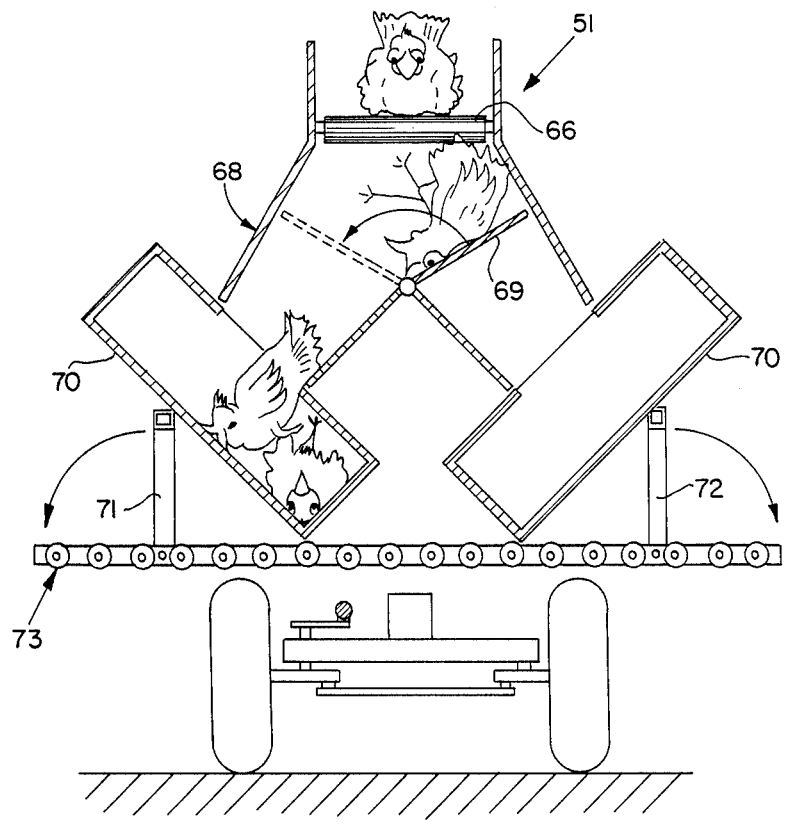
FIG. 6 is a partly sectional and schematic view according to VI—VI in FIG. 3.

The animals being supplied in the delivery station 67 by the conveyor belt 66 are guided through a chute 68 in a respective crate 70 as shown in FIG. 6. The chute 68 has two exits which can be selectively closed by means of the flap 69. As soon as in a crate 70 the desired number of animals are received, which can be detected in a way described before by means of a weighing device, the flap 69 is swung in its other position, after which the filled crate can be replaced by an empty crate.

As is further shown by FIG. 6 the crates 70 preferably are supported in an oblique position by the supports 71 and 72, which supports 71 and 72 can be folded away in the direction of the arrows. Because of the oblique position of the crates 70 during filling it is prevented that the animals remain directly under the filling opening of the crates 70, as a consequence of which the entry for subsequent animals would be hindered. After repositioning of the flap 69 the relevant support 71 or 72 is folded away and the crate is positioned horizontal on the roller track 73. The animals which were not yet fully entered in the crate 70 move sideways, so that automatically a good filling of the crate is obtained. The filled crate subsequently is discharged over the roller track 73 sideways.

The device embodying the invention may be a drawn or pushed vehicle as shown in the Figures, but it may, as an alternative, be provided with its own propelling means. The swinging movement of the arm may be automatically performed, for example, it may be coupled with the advancint movement so that the pick-up end of the arm can uniformly cover the total ground surface.

In a suitable way the device can be powered hydraulically. The necessary hydraulic pressure can be supplied by a hydraulic pump coupled with a motor, for instance a combustion engine. In a suitable way also the motor of the suction device can be a hydraulic motor, so that the dimensions thereof remain limited. The coordinated control of the several movements can suitably be constructed from means known as such.

What is claimed is:

1. A device for picking up animals such as chickens from a ground surface and for conducting them away, comprising a frame, a suction conveyor arranged on the frame and provided with suction means and delivery means adjoining said suction conveyor characterized in that the suction conveyor comprises a rotatable belt providing a suction surface having suction apertures through which the suction means can suck in air and guiding and driving means supporting said belt for moving animals picked up by the belt suction surface towards the delivery means.

2. A device as claimed in claim 1 characterized in that the suction surface is formed by an active part of the suction conveyor belt defined by the guiding and driving means, extending above the ground surface and sloping upwards at least partly in the direction of movement.

3. A device as claimed in claim 2 characterized in that an initial part of the active part of the suction conveyor belt extends parallel to the ground surface.

4. A device as claimed in claim 2 characterized in that the driving means for the suction conveyor belt, the delivery means, the pivotable arm and the propelling means for the device are continuously controllable.

5. A device as claimed in claims 1 or 2 characterized in that the suction conveyor belt is arranged at the end of an arm pivotable about a pivotal shaft perpendicular to the ground surface and connected with the frame.

6. A device as claimed in claim 5 characterized in that the arm is hollow and constitutes a suction channel of the suction means.

7. A device as claimed in claim 5 characterized in that the suction means are integral with the arm.

8. A device as claimed in claim 5 characterized in that the frame is provided with wheels bearing on the ground, and in that an oblong belt-like member with its ends is connected to the arm near the ground and in that tension and guiding means are provided guiding the belt-like member between its ends with its plane transverse to the ground and with a longitudinal edge closely near the ground around at least the wheels in the area near the arm.

9. A device as claimed in claim 8 characterized by reciprocating driving means connected to the frame and engaging the belt-like member for to and fro moving from the arm.

10. A device as claimed in claim 5 characterized in that the delivery means comprise a delivery conveyor belt connected with the frame and extending from the pivotal shaft to a delivery station.

11. A device as claimed in claim 10 characterized in that the delivery means comprise an elevator belt connected with the arm, adjoining the suction conveyor belt and extending to the pivotal shaft.

12. A device as claimed in claim 10 characterized in that the delivery conveyor belt is pivotally connected with the frame near the pivotal shaft.

13. A device for picking up animals such as chickens and conveying them in suspended fashion to a discharge region, which comprises the combination of:
   a hollow arm having a bottom side opening presenting an inlet end and a discharge end;
   suction means for drawing ambient air through said bottom side opening;
   conveyor means closing said bottom side opening while allowing ambient air to pass therethrough for holding an animal against the conveyor means between said inlet and said discharge ends of the opening; and
   means for travelling the conveyor means to transport an animal held against said conveyor means to a discharge region at said discharge end of said bottom side opening.

14. A device as defined in claim 13 including means for sweeping said arm horizontally so as to pick up animals within the path of such sweep.

15. A device as defined in claim 13 or 14 wherein conveyor means includes a generally horizontal portion extending from said inlet end and an upwardly inclined portion extending to said discharge end.

16. A device as defined in claim 15 including second conveyor means for receiving animals at said discharge region and conveying them to a crating region.

17. A device as defined in claim 14 wherein said arm is pivoted about a generally vertical axis which substantially intersects said discharge end of the opening, and second conveyor means for receiving animals at said discharge region and conveying them to a crating region.

18. A device for picking up animals such as chickens located in a chicken yard and conveying them into a crate, which comprises the combination of:
   a mobile frame;
   an arm carried by said frame about a generally vertical axis and means for pivoting said arm back and forth about said axis so that one end of the arm sweeps an arcuate path, said arm being hollow and having a bottom opening extending generally horizontally from said one end toward said axis and then upwardly substantially to said axis;
   porous conveyor means closing said opening to present a flight portion which is generally horizontal from said one end of the opening extending toward said axis and an upwardly inclined flight portion extending substantially to said axis and means for driving said porous conveyor means so that said flight portions travel from said one end of the bottom opening toward said axis;
   a second conveyor means having an inlet end disposed below said bottom opening substantially at said axis and an elevated discharge end remote from said axis; and means for drawing ambient air through said bottom opening with sufficient force to draw an animal upwardly against said porous conveyor means and suspend the animal while conveying it upwardly toward said axis until that end of the opening which ends substantially at said axis is encountered, whereupon the animal drops onto said second conveyor means.

19. A device as defined in claim 18 wherein said second conveyor means underlies and overlaps said porous conveyor means sufficiently to blind said porous conveyor means partially in the region where the animal drops onto said second conveyor means.

* * * * *